US012585623B1

(12) United States Patent
Bhakta et al.

(10) Patent No.: US 12,585,623 B1
(45) Date of Patent: Mar. 24, 2026

(54) SYNCHRONIZING LOOSELY COUPLED SYSTEMS AT A SOURCE SYSTEM

(71) Applicant: Zoom Communications, Inc., San Jose, CA (US)

(72) Inventors: Rajaram Mohandas Bhakta, San Jose, CA (US); Sivakumar Damodaran Pooruli, Fremont, CA (US); Swetha Tumkur Prakash, Bangalore (IN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 18/428,464

(22) Filed: Jan. 31, 2024

(51) Int. Cl.
    *G06F 7/00*     (2006.01)
    *G06F 16/215*     (2019.01)
    *G06F 16/27*     (2019.01)

(52) U.S. Cl.
    CPC ............ *G06F 16/215* (2019.01); *G06F 16/27* (2019.01)

(58) Field of Classification Search
    CPC ............................... G06F 16/215; G06F 16/27
    See application file for complete search history.

(56) References Cited

U.S. PATENT DOCUMENTS

| | | | | |
|---|---|---|---|---|
| 7,137,100 | B2 * | 11/2006 | Iborra ........................ | G06F 8/30 717/109 |
| 9,137,256 | B2 * | 9/2015 | Singhal .................. | H04L 63/126 |
| 9,210,030 | B1 | 12/2015 | Miller et al. | |
| 9,734,224 | B2 | 8/2017 | Chatterjee et al. | |
| 9,804,957 | B1 * | 10/2017 | Chopra ............... | G06F 11/3692 |
| 10,430,437 | B2 * | 10/2019 | Purushothaman .... | G06F 16/278 |
| 10,503,723 | B2 | 12/2019 | Zachrisen et al. | |
| 10,963,435 | B1 * | 3/2021 | McAlister ........... | G06F 11/0766 |
| 10,965,547 | B1 | 3/2021 | Esposito et al. | |
| 11,190,587 | B1 | 11/2021 | Burnett et al. | |
| 11,194,783 | B2 | 12/2021 | Bandyopadhyay et al. | |
| 11,487,631 | B2 | 11/2022 | Willoughby et al. | |
| 11,526,470 | B2 | 12/2022 | Lee | |
| 11,797,541 | B1 * | 10/2023 | Fitzgerald ......... | G06F 16/24564 |
| 11,940,960 | B2 | 3/2024 | Mulcrone | |
| 12,068,911 | B2 * | 8/2024 | Ingah .................... | H04L 41/069 |
| 2008/0205655 | A1 * | 8/2008 | Wilkins ................. | G06Q 10/10 707/999.005 |
| 2012/0204032 | A1 * | 8/2012 | Wilkins ................. | H04L 9/321 713/170 |
| 2012/0272221 | A1 | 10/2012 | Pessoa et al. | |

(Continued)

FOREIGN PATENT DOCUMENTS

| | | |
|---|---|---|
| CN | 108200220 B | 7/2021 |
| WO | 2001057720 A2 | 8/2001 |

*Primary Examiner* — Mohammed R Uddin
(74) *Attorney, Agent, or Firm* — Young Basile Hanlon & MacFarlane, P.C.

(57) ABSTRACT

Synchronizing loosely coupled systems where a source system determines a source evaluation of a validation function based on a data record sent to a target system and the source system receives from the target system a target evaluation of the validation function based on the data record. The source system compares the source evaluation to the target evaluation and, in response to a mismatch, the source system executes a predefined action for synchronizing the data record at the target system with the data record at the source system. The predefined action may comprise the source system resending the data record to the target system.

20 Claims, 8 Drawing Sheets

100

(56)            References Cited

U.S. PATENT DOCUMENTS

| | | | |
|---|---|---|---|
| 2013/0124473 A1* | 5/2013 | Gutberlet | G06F 16/273 |
| | | | 707/634 |
| 2015/0019488 A1 | 1/2015 | Higginson et al. | |
| 2015/0244795 A1* | 8/2015 | Cantwell | G06F 16/27 |
| | | | 709/202 |
| 2015/0269212 A1* | 9/2015 | Kramer | G06F 16/2358 |
| | | | 707/687 |
| 2016/0070725 A1 | 3/2016 | Marrelli et al. | |
| 2016/0085794 A1* | 3/2016 | Bengali | G06F 16/2365 |
| | | | 707/602 |
| 2016/0110439 A1* | 4/2016 | Hrle | G06F 16/2358 |
| | | | 707/600 |
| 2016/0306864 A1* | 10/2016 | Estes, Jr. | G06F 16/27 |
| 2017/0322794 A1* | 11/2017 | Ferlitsch | H04L 67/01 |
| 2017/0330078 A1* | 11/2017 | Koduru | G06N 5/01 |
| 2018/0300390 A1 | 10/2018 | Burchard et al. | |
| 2019/0005086 A1 | 1/2019 | Manor | |
| 2019/0102258 A1 | 4/2019 | Banister | |
| 2020/0007344 A1 | 1/2020 | Chepak, Jr. et al. | |
| 2020/0104236 A1* | 4/2020 | Creel | G06F 16/2365 |
| 2021/0357424 A1 | 11/2021 | Martynov et al. | |
| 2022/0012134 A1* | 1/2022 | Chatterjee | G06F 11/1456 |
| 2022/0075692 A1* | 3/2022 | Guha | G06F 40/30 |
| 2022/0188324 A1* | 6/2022 | Ramesh | G06F 16/254 |
| 2022/0261395 A1 | 8/2022 | Gubba et al. | |
| 2023/0034941 A1 | 2/2023 | Bos et al. | |
| 2023/0296918 A1* | 9/2023 | Muschielok | G02C 7/028 |
| | | | 351/159.74 |
| 2023/0334069 A1* | 10/2023 | Kozak | G06F 40/151 |
| 2023/0385271 A1 | 11/2023 | Bensberg et al. | |
| 2024/0241981 A1* | 7/2024 | Tong | G06F 21/6218 |
| 2024/0354291 A1* | 10/2024 | Achappan | G06F 16/27 |
| 2025/0005014 A1* | 1/2025 | Gubba | G06F 16/258 |

\* cited by examiner

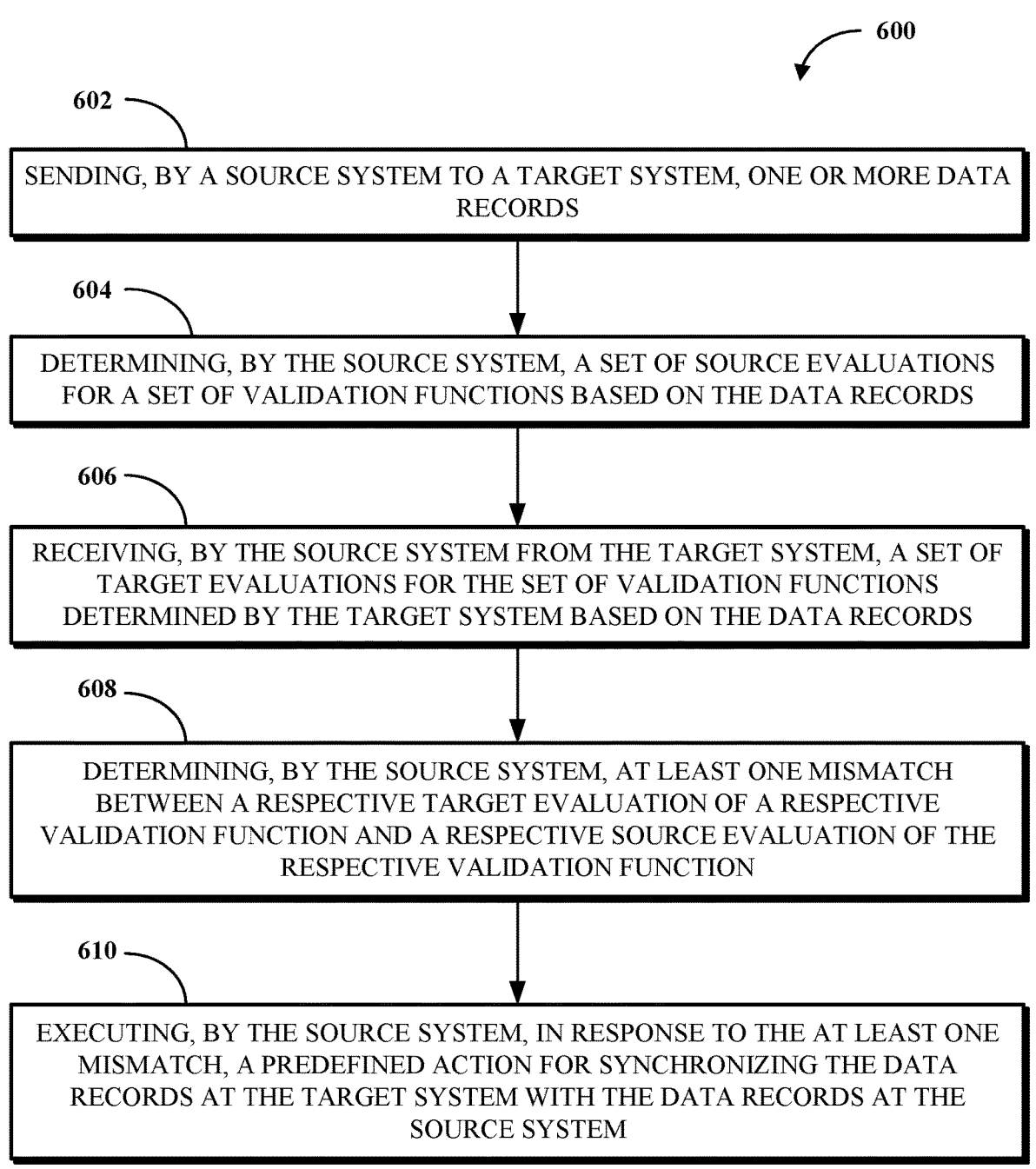

602

SENDING, BY A SOURCE SYSTEM TO A TARGET SYSTEM, ONE OR MORE DATA RECORDS

604

DETERMINING, BY THE SOURCE SYSTEM, A SET OF SOURCE EVALUATIONS FOR A SET OF VALIDATION FUNCTIONS BASED ON THE DATA RECORDS

606

RECEIVING, BY THE SOURCE SYSTEM FROM THE TARGET SYSTEM, A SET OF TARGET EVALUATIONS FOR THE SET OF VALIDATION FUNCTIONS DETERMINED BY THE TARGET SYSTEM BASED ON THE DATA RECORDS

608

DETERMINING, BY THE SOURCE SYSTEM, AT LEAST ONE MISMATCH BETWEEN A RESPECTIVE TARGET EVALUATION OF A RESPECTIVE VALIDATION FUNCTION AND A RESPECTIVE SOURCE EVALUATION OF THE RESPECTIVE VALIDATION FUNCTION

610

EXECUTING, BY THE SOURCE SYSTEM, IN RESPONSE TO THE AT LEAST ONE MISMATCH, A PREDEFINED ACTION FOR SYNCHRONIZING THE DATA RECORDS AT THE TARGET SYSTEM WITH THE DATA RECORDS AT THE SOURCE SYSTEM

FIG. 6

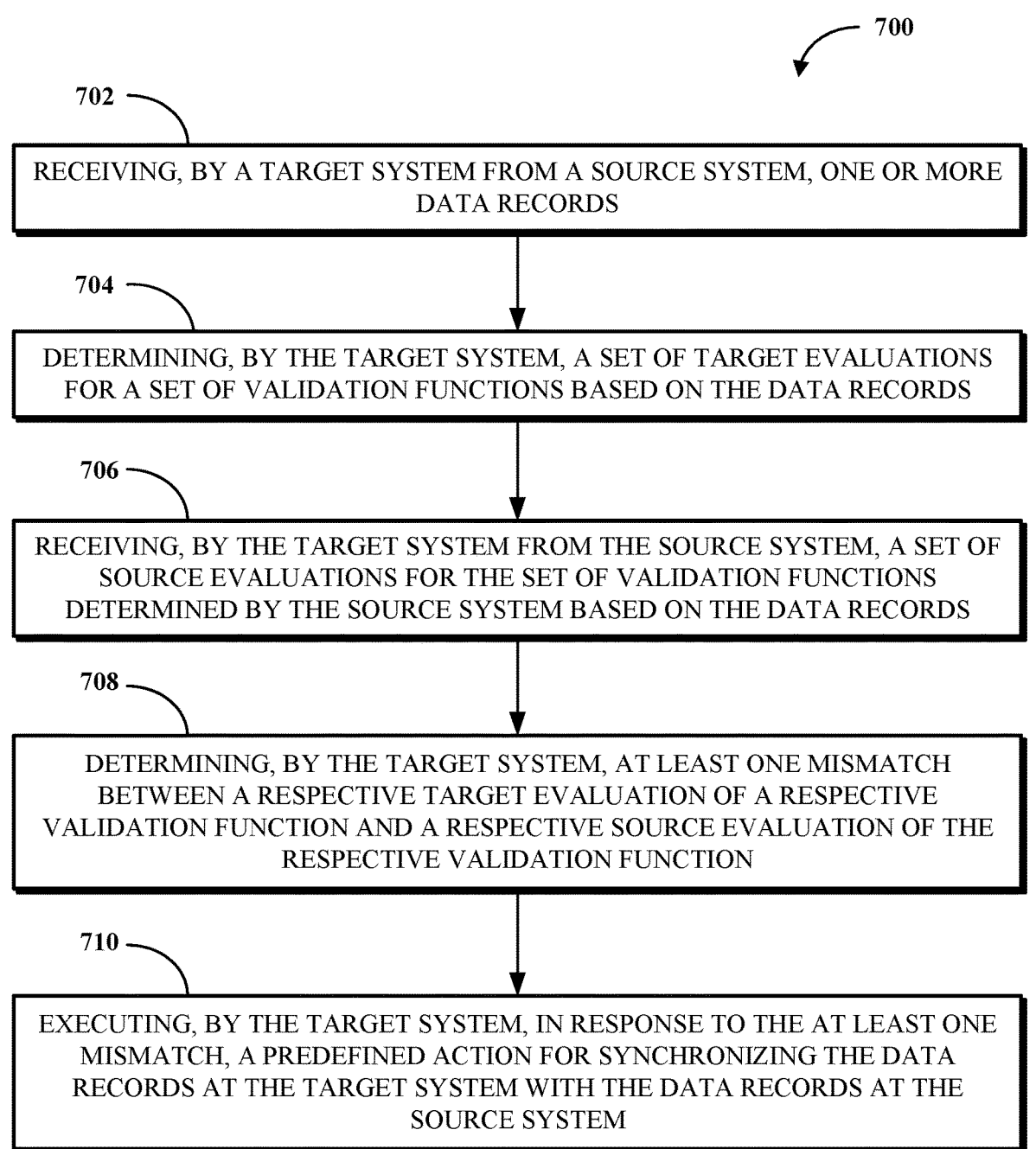

700

702

RECEIVING, BY A TARGET SYSTEM FROM A SOURCE SYSTEM, ONE OR MORE DATA RECORDS

704

DETERMINING, BY THE TARGET SYSTEM, A SET OF TARGET EVALUATIONS FOR A SET OF VALIDATION FUNCTIONS BASED ON THE DATA RECORDS

706

RECEIVING, BY THE TARGET SYSTEM FROM THE SOURCE SYSTEM, A SET OF SOURCE EVALUATIONS FOR THE SET OF VALIDATION FUNCTIONS DETERMINED BY THE SOURCE SYSTEM BASED ON THE DATA RECORDS

708

DETERMINING, BY THE TARGET SYSTEM, AT LEAST ONE MISMATCH BETWEEN A RESPECTIVE TARGET EVALUATION OF A RESPECTIVE VALIDATION FUNCTION AND A RESPECTIVE SOURCE EVALUATION OF THE RESPECTIVE VALIDATION FUNCTION

710

EXECUTING, BY THE TARGET SYSTEM, IN RESPONSE TO THE AT LEAST ONE MISMATCH, A PREDEFINED ACTION FOR SYNCHRONIZING THE DATA RECORDS AT THE TARGET SYSTEM WITH THE DATA RECORDS AT THE SOURCE SYSTEM

FIG. 7

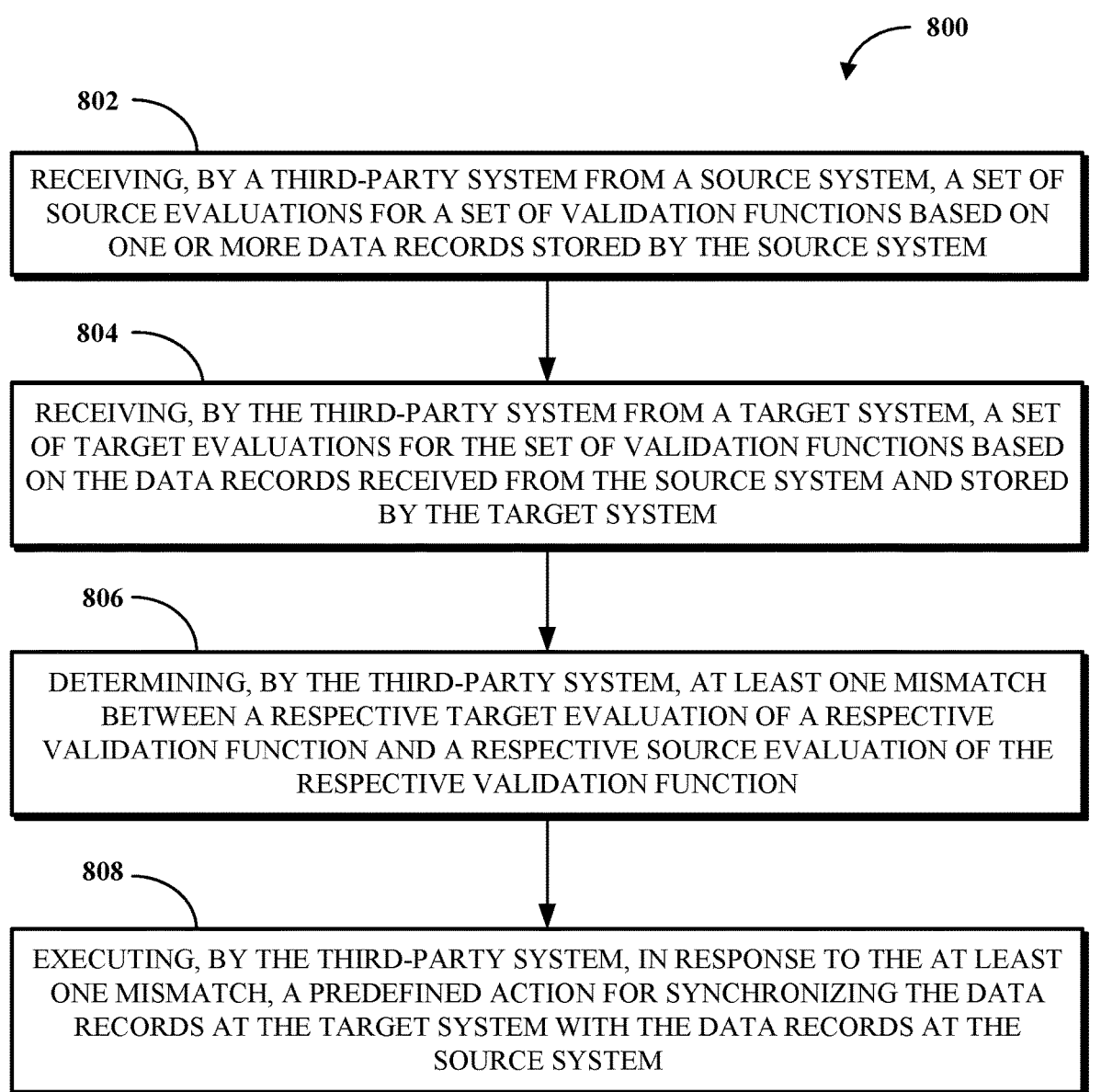

800

802

RECEIVING, BY A THIRD-PARTY SYSTEM FROM A SOURCE SYSTEM, A SET OF SOURCE EVALUATIONS FOR A SET OF VALIDATION FUNCTIONS BASED ON ONE OR MORE DATA RECORDS STORED BY THE SOURCE SYSTEM

804

RECEIVING, BY THE THIRD-PARTY SYSTEM FROM A TARGET SYSTEM, A SET OF TARGET EVALUATIONS FOR THE SET OF VALIDATION FUNCTIONS BASED ON THE DATA RECORDS RECEIVED FROM THE SOURCE SYSTEM AND STORED BY THE TARGET SYSTEM

806

DETERMINING, BY THE THIRD-PARTY SYSTEM, AT LEAST ONE MISMATCH BETWEEN A RESPECTIVE TARGET EVALUATION OF A RESPECTIVE VALIDATION FUNCTION AND A RESPECTIVE SOURCE EVALUATION OF THE RESPECTIVE VALIDATION FUNCTION

808

EXECUTING, BY THE THIRD-PARTY SYSTEM, IN RESPONSE TO THE AT LEAST ONE MISMATCH, A PREDEFINED ACTION FOR SYNCHRONIZING THE DATA RECORDS AT THE TARGET SYSTEM WITH THE DATA RECORDS AT THE SOURCE SYSTEM

FIG. 8

SYNCHRONIZING LOOSELY COUPLED SYSTEMS AT A SOURCE SYSTEM

FIELD

This disclosure generally relates to synchronizing loosely coupled systems, and more specifically, to synchronizing data records between applications executing on source and target systems.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIG. 6 is a flowchart of a first example of a technique for synchronizing data records between loosely coupled systems at a source system.

FIG. 7 is a flowchart of a first example of a technique for synchronizing data records between loosely coupled systems at a target system.

FIG. 8 is a flowchart of a first example of a technique for synchronizing data records between loosely coupled systems at a third-party system.

DETAILED DESCRIPTION

Figure 1:
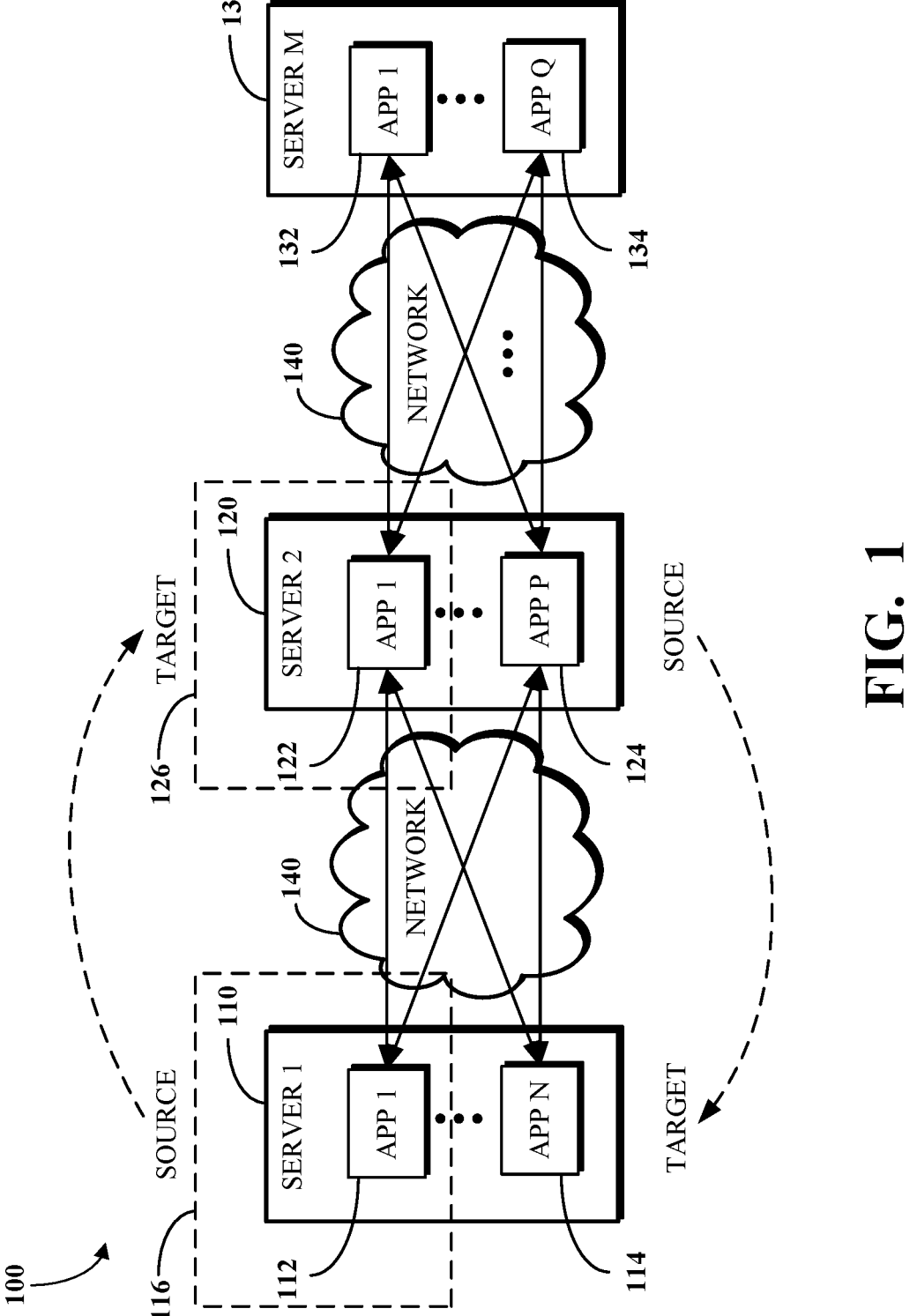
FIG. 1 is a block diagram of an example of an electronic computing and communications system.

Software as a Service (SaaS) is a distributed software model that enables device users to connect to and use cloud-based applications over the Internet. Some enterprise users rely on SaaS applications for certain business processes, such as data warehousing, invoicing, customer relationship management (CRM), collections, and so on. SaaS solutions can provide rapid and/or on-demand deployment of software applications with minimal software development and maintenance for users.

SaaS applications may execute on globally distributed servers. Some of the servers and/or some of the applications may be managed by different SaaS providers, which can result in or exacerbate undesired temporary or permanent mismatches in data records between different SaaS applications. For example, a data record may be intentionally deleted at a source system (defined below), but the source system may not immediately notify downstream target systems (defined below) of the deletion, causing a data-record mismatch at least until the source system notifies the target systems. Depending, for example, on data-synchronization policies of the SaaS application at the source system (e.g., batch processing, handshake protocols, etc.) and the type and size of the data record, the source system may not notify the target system for hours or days. Additionally, data records can be lost or become corrupt during transactions between SaaS applications, causing data-record mismatches between SaaS applications. For example, a data record stored on a source system may contain formatting, fields, characters, or encodings that cannot be properly ingested, or processed, by a target system. Depending, for example, on data-synchronization policies of the SaaS application at the target system (e.g., batch processing, handshake protocols, etc.) and the type and size of the data record, the target system may delay notifying the source system of the error, or the target system may never notify the source system of the error. During a mismatch period, when the target system's data records are out of synch with the source system's data records, the SaaS application on the target system may perform operations on the unsynchronized data records, which may cause further mismatches to further downstream systems or to end-users or clients. Thus, these data synchronization limitations of SaaS applications may negatively impact SaaS data processing and/or data reporting.

Implementations of the disclosed technology accordingly address several of the aforementioned limitations of data synchronization between SaaS applications. One or more rules are specified for each type of data record for which tight data synchronization is desired. A rule indicates at least a source system, a target system, a validation function, and an action to be performed. The source system is a system, such as a cloud server, on which a first SaaS application is executing and from which data records will be sent. A target system is a system, such as a cloud server, on which a second SaaS application is executing and to which data records will be sent. A target system may be a source system with respect to other downstream systems, and a source system may be a target system with respect to other upstream systems. In some implementations, the source and target systems may be a same physical system, e.g., a server executing a SaaS application. The validation function is a function for validating one or more data records sent by the source system and received by the target system. One example of a validation function is aggregating multiple values of one or more data records to fewer values or to a single value, for example, summing multiple values to yield a single sum. Aggregation can result in reduced network traffic when synchronizing data records between a source system and a target system, because sending aggregated data to a system that will determine mismatches generally consumes less network resources than sending complete data records. The action of a rule comprises steps for resynchronizing mismatched data records, for example, by causing the source system to resend one or more data records or to send an error message (e.g., to trigger manual intervention). Types of data records may include, for example, numeric, alphanumeric, integer, float, binary, string, financial, time, date, image, video, multimedia, and so on. A single data record may be categorized as multiple types.

When a source system sends one or more data records to a target system, the source system evaluates the validation function (or set of validation functions) defined by the rule (or set of rules) for the data records to determine a source evaluation (or set of source evaluations). Similarly, when the target system receives the one or more data records from the source system, the target system evaluates the validation function (or set of validation functions) defined by the rule (or set of rules) for the data records to determine a target evaluation (or set of target evaluations). An evaluation of a validation function is an output of the validation function based on the one or more data records as inputs. Subsequently, a system, for example, the source system, the target system, or another system, compares the source evaluation for a respective validation function to the target evaluation for the respective validation function to determine mismatches therebetween. In other words, mismatches in data records are determined by comparing source and target evaluations of the data records, and not by comparing the source and target data records themselves. If there is a mismatch, the system executes the action indicated by the rule for synchronizing the data records at the target system with the data records at the source system, for example, causing the source system to resend the one or more data records to the target system or sending an error message.

To describe some implementations in greater detail, reference is first made to examples of hardware and software structures that can be used to implement the synchronization of data records between loosely coupled systems. FIG. 1 is a block diagram of an example of an electronic computing and communications system 100, which can be or include a distributed computing system (e.g., a distributed SaaS environment), a cloud computing system, a clustered computing system, or the like.

The system 100 includes one or more servers, such as server 110, server 120, through server 130. In some implementations, one or more of the servers 110, 120, through 130 can be a non-hardware server implemented on a physical device, such as a hardware server. In some implementations, a combination of two or more of the servers 110, 120, through 130 can be implemented as a single hardware server or as a single non-hardware server implemented on a single hardware server.

Each server may execute one or more SaaS applications, such as applications 112 through 114 on server 110, applications 122 through 124 on server 120, and applications 132 through 134 on server 130. Non-limiting examples of SaaS applications include data warehousing, invoicing, CRM, collections, computer-aided design (CAD), computer-aided engineering (CAE), electronic design automation (EDA), video-conferencing, content management system (CMS), project management, eCommerce, enterprise management, social media management, user-engagement, digital signature management, telephony, team communications, data analytics, web hosting, web creation, web optimization, document management, live streaming, lead management, cloud integration, help desk, information technology, legal documentation, legal research, consumer research, dashboard and reporting management, software development, source code management, productivity, multimedia creation, compliance management, and so on.

A first application on a first server, such as the application 112 on the server 110, may be referred to as a first system 116, where the first system 116 may include hardware components of the server 110, such as a processor coupled to a non-transitory computer-readable medium (e.g., a memory), and software components of the application 112, such as software instructions storable in the memory and executable by the processor. Similarly, a second application on a second server, such as the application 122 on the server 120, may be referred to as a second system 126, where the second system 126 may include hardware components of the server 120, such as a processor coupled to a non-transitory computer-readable medium (e.g., a memory), and software components of the application 122, such as instructions storable in the memory and executable by the processor.

The first system 116 may communicate with the second system 126 by a network 140. The network 140 can be or include, for example, the Internet, a local area network (LAN), a wide area network (WAN), a virtual private network (VPN), or another public or private means of electronic computer communication capable of transferring data between a client and one or more servers. In some implementations, a system can connect to the network 140 via a communal connection point, link, or path, or using a distinct connection point, link, or path. For example, a connection point, link, or path can be wired (e.g., electrical or optical), wireless (e.g., electromagnetic, optical), use other communications technologies, or a combination thereof. The network 140 can include network hardware such as routers, switches, other network devices, or combinations thereof. For example, a server, such as the servers 110, 120, through 130, or the network 140 can include a load balancer (not shown in FIG. 1) for routing traffic between the various servers 110, 120, through 130. The load balancer can route, or direct, computing communications traffic, such as signals or messages, to respective applications 112 through 114, 122 through 124, and 132 through 134, of each server 110, 120, through 130, respectively.

For example, the load balancer can operate as a proxy, or reverse proxy, for a service, such as a service provided to one or more applications, such as one or more of the applications 112 through 114, 122 through 124, and 132 through 134. Routing functions of the load balancer can be configured directly or via a domain name system (DNS). The load balancer can coordinate requests from remote computing devices and can simplify server access by masking the internal configuration of a first server, such as one of the servers 110, 120, through 130, from a second server, such as another one of the servers 110, 120, through 130. In some implementations, the load balancer can operate as a firewall, allowing or preventing communications based on configuration settings.

The system 100 can include a configuration of servers and applications different from that generally illustrated in FIG. 1. For example, and without limitation, an application of a given server may communicate with multiple applications on multiple different servers.

If, for example, the first system 116 sends data to the second system 126, the first system 116 may be considered a source system and the second system 126 may be considered a target system. The first system 116 and the second system 126 may each be a source system and/or a target system. Data, which may, for example, be configured as discrete data records, may be stored by one or more servers, such as one or more of the servers 110, 120, through 130, in a non-transitory computer-readable medium (e.g., a memory), such as random-access memory (RAM), read-only memory (ROM), flash, magnetic disc (e.g., a hard drive), magnetic tape, and so on. The one or more servers may implement one or more databases, tables, or other information sources suitable for use with a software application, such as one or more of the SaaS applications 112 through 114, 122 through 124, and 132 through 134. The one or more servers may include a data storage unit accessible by a software application, such as a database, which may be a relational database management system (RDBMS), an object database, an XML database, a configuration management database (CMDB), a management information base (MIB), one or more flat files, other suitable non-transient storage mechanisms, or a combination thereof.

Figure 2:
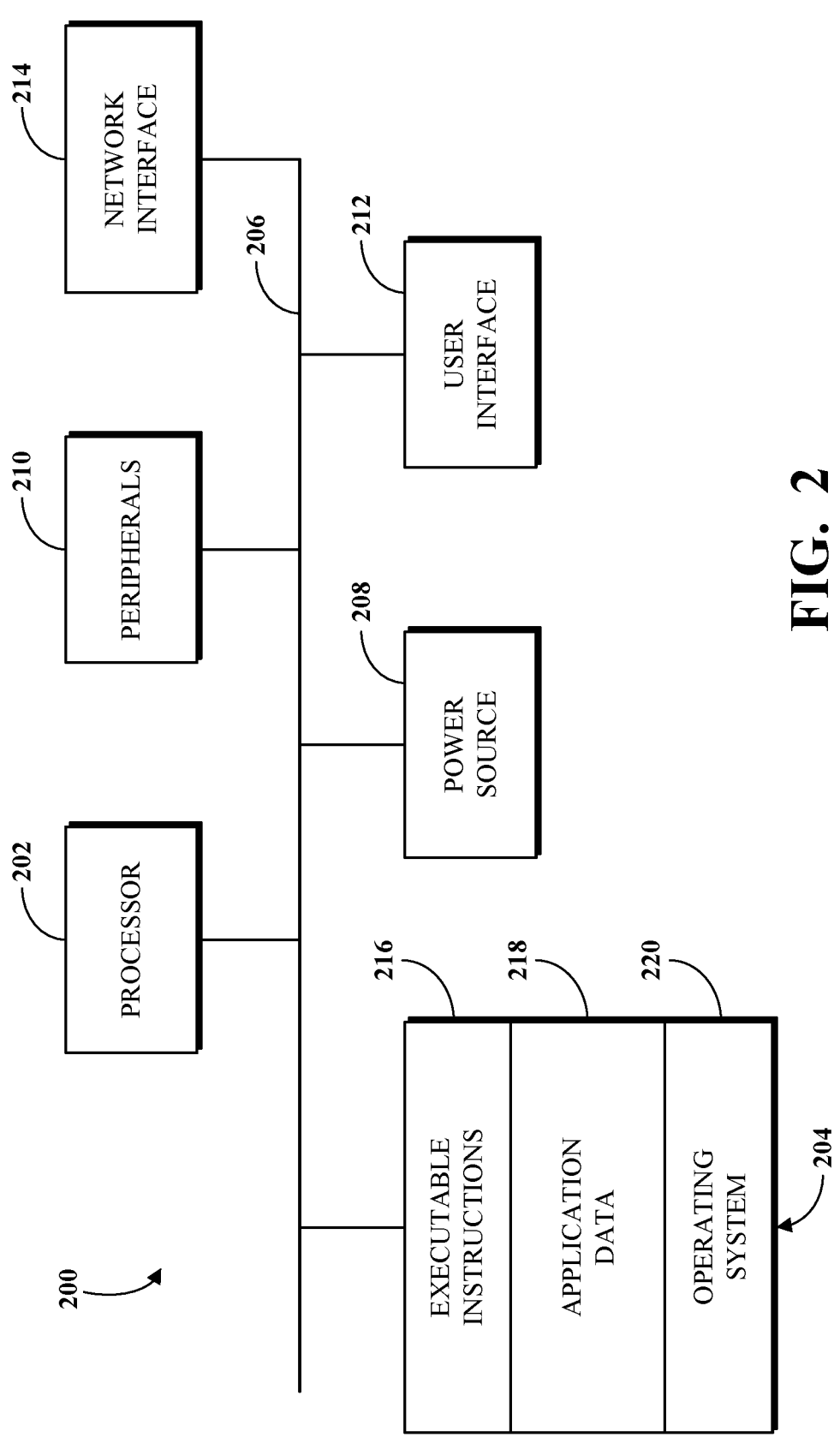
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the servers 110, 120, through 130 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be RAM (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 140 shown in FIG. 1). The network interface 214 can be a wired network interface or a wireless network interface. The computing device 200 can communicate with other devices via a network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
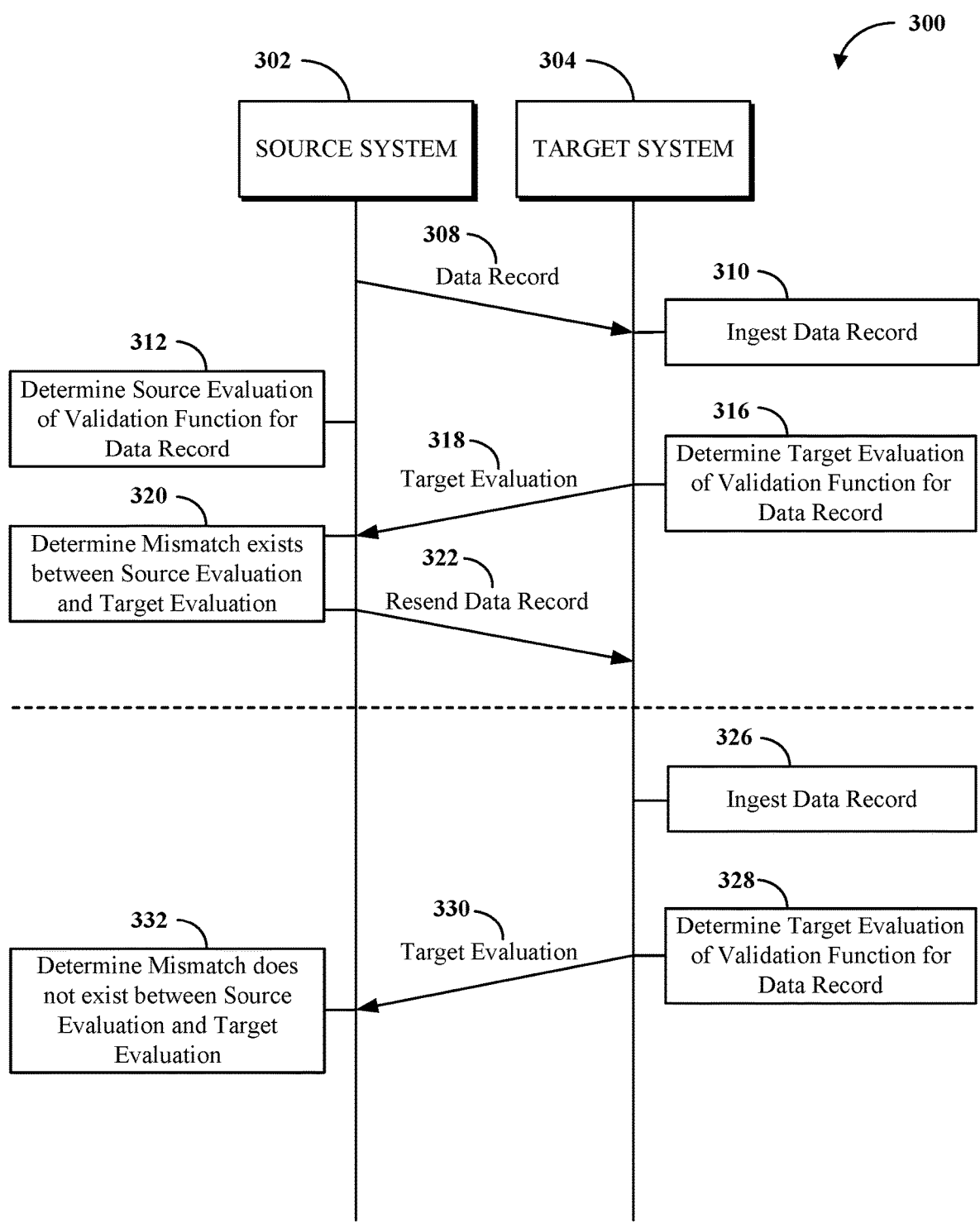
FIG. 3 is a time-space diagram of an example of synchronizing data records between loosely coupled systems at a source system.

FIG. 3 shows a time-space diagram of an example implementation 300 of synchronizing data records 308 between loosely coupled systems at a source system 302. The source system 302, which may be an instance of the computing device 200 of FIG. 2, sends at least one data record 308 to the target system 304, which may also be an instance of the computing device 200 of FIG. 2. The data record 308 may be sent via a network, such as the network 140 of FIG. 1. The target system 304 ingests the data record 308 in an ingest step 310, where ingesting the data record 308 comprises receiving and parsing the data record 308 and saving the data record 308 to a memory, such as an instance of the memory 204 of FIG. 2.

The target system 304 evaluates a validation function for the data record 308 in a determining target evaluation step 316. In some implementations, the target system 304 evaluates the validation function for the data record 308 immediately or shortly after receiving the data record 308. In some implementations, the target system 304 delays evaluating the validation function for the data record 308 until, for example, the target system 304 receives a threshold quantity, or count, of data records 308 or until a scheduled time for evaluating validation functions arrives. The target evaluation 318 is an output, or result, of the target system 304 evaluating the validation function with the data record 308 as an input to the validation function. In some implementations, the target system 304 may receive the validation function from the source system 302. In some implementations, the target system 304 may receive an indication of an association of the validation function with the data record, for example, from the source system 302. The association may be specific to the data record 308, or it may be specific to one or more types of data records, of which the data record 308 is at least one type. For example, the data record 308 may comprise monthly invoices for a customer, which could be broadly categorized as an "invoice" data-record type, and the validation function could be associated with all data records of the "invoice" data-record type. The target system 304 may receive the validation function and the indication of the association of the validation function with the data record 308 before, contemporaneously with, or after receiving the data record 308.

The target system 304 sends the target evaluation 318 to the source system 302. In some implementations, the target system 304 sends the target evaluation 318 immediately or shortly after evaluating the validation function. In some implementations, the target system 304 delays sending the target evaluation 318 until, for example, the target system 304 evaluates a threshold quantity, or count, of validation functions or until a scheduled time for sending target evaluations 318 arrives. In some implementations, the target system 304 expects to receive a response, or acknowledgment, from the source system 302 confirming that the source system 302 received the target evaluation 318. In some implementations, the target system 304 resends the target evaluation 318 if the target system 304 does not receive an expected response, or acknowledgment, from the source system 302 within a given duration. In some implementations, the target system 304 sends the target evaluation 318 to the source system 302 at predefined intervals, e.g., daily or weekly. In some implementations, the source system 302 may indicate a predefined interval to the target system 304.

The source system 302 evaluates the validation function for the data record 308 in a determining source evaluation step 312. The determining source evaluation step 312 may occur before or after the source system 302 sends the data record 308 to the target system 304. The source evaluation is an output, or result, of the source system 302 evaluating the validation function with the data record 308 as an input to the validation function. Both the source system 302 and the target system 304 evaluate the same validation function based on the same data records 308, such that the source evaluation and the target evaluation 318 are expected to be identical for a properly functioning distributed SaaS environment.

The source system 302 compares the source evaluation to the target evaluation 318 in a determining mismatch step 320, and if a mismatch exists, the source system 302 executes a predefined action 322 for synchronizing the data record 308 at the target system 304. In some implementations, the source system 302 delays comparing the source evaluation to the target evaluation 318 until, for example, a threshold quantity, or count, of target evaluations 318 has been received or until a scheduled time for daily comparisons arrives. In the example of FIG. 3, the action 322 comprises the source system 302 resending the data record 308, or a subset thereof, to the target system 304. Another example of the predefined action 322 (not shown in FIG. 3) comprises the source system 302 sending an error message to a computing device that may trigger manual intervention, e.g., analysis by a human. In some implementations, the source system 302 delays executing the predefined action 322 until, for example, a threshold quantity, or count, of mismatches has been determined or until a scheduled time for daily synchronizations arrives. In some implementations, the source system 302 may consider the count of mismatches in determining whether to execute the predefined action 322, e.g., executing the predefined action 322 only if a threshold quantity of mismatches occurs within a given duration (where the duration may be infinite, and where the count may reset upon executing the predefined action 322). In some implementations, the source system 302 may consider a degree of mismatch, or criticality, in determining whether and/or when to execute the predefined action 322, e.g., executing the predefined action 322 only if difference between the source evaluation and the target evaluation 318 is greater than a given percentage of the source evaluation.

In some implementations, the source system 302 may consider a priority, or priority level, of the validation function in determining whether and/or when to execute the predefined action 322, e.g., executing the predefined action 322 only if the evaluation function yielding a mismatch has a priority that exceeds a threshold priority.

In some implementations, the validation function comprises an aggregation operation. In some implementations, the validation function comprises at least one of a summation operation; an average operation; a count operation; a minimum operation; or a maximum operation. For example, using the example of monthly invoices from above, the data record may comprise all unpaid customer invoices. Each invoice may indicate, for example, an invoice number, a customer name, a customer address, and a balance due, where the invoice number may be categorized as an invoice-number data-record type, the customer name and customer address may be categorized as an invoice-string data-record type, and the balance due may be categorized as an invoice-balance data-record type. Some validation functions may utilize regular expression (RegExp) operations. Some validation functions may utilize machine learning (ML) and/or artificial intelligence (AI) models. Some validation functions may include operations on occurrences or properties of data records, such as first, last, distinct, rank, and field length.

An example of a validation function for the invoice-balance data-record type may comprise a summation of all balances due for all unpaid invoices. Both the source system 302 and the target system 304 would evaluate this validation function by summing the balance due across all unpaid invoices. The target system 304 would send to the source system 302 the target evaluation 318 that comprises the sum, i.e., a total balance due, as opposed to multiple balances due from multiple invoices. The source system 302 would compare the source evaluation (i.e., the total balance due as determined by the source system 302) to the target evaluation 318 (i.e., the total balance due as determined by the target system 304) to determine mismatches between the data record 308 stored at the source system 302 and the data record 308 stored at the target system 304.

An example of a validation function for the invoice-number data-record type may comprise a count of all invoice numbers for all unpaid invoices. Both the source system 302 and the target system 304 would evaluate this validation function by counting the quantity of invoice numbers across all unpaid invoices. The target system 304 would send to the source system 302 the target evaluation 318 that comprises the count, i.e., a single count of unpaid invoices, as opposed to multiple invoice numbers from multiple invoices. The source system 302 would compare the source evaluation (i.e., the invoice count as determined by the source system 302) to the target evaluation 318 (i.e., the invoice count as determined by the target system 304) to determine mismatches between the data record 308 stored at the source system 302 and the data record 308 stored at the target system 304.

In both of the preceding examples, the target evaluation 318 that is sent from the target system 304 to the source system 302 typically consists of less data, or at least not more data, than the original data record 308 sent from the source system 302 to the target system 304.

After the source system 302 resends the data record 308 to the target system 304 as the predefined action 322: the target system 304 ingests the data record in another ingest step 326; the target system 304 evaluates the validation function for the data record 308 in another determining target evaluation step 328; the target system 304 sends the newly determined target evaluation 330 to the source system 302; and the source system 302 compares the source evaluation to the target evaluation 330 in another determining mismatch step 332.

Figure 4:
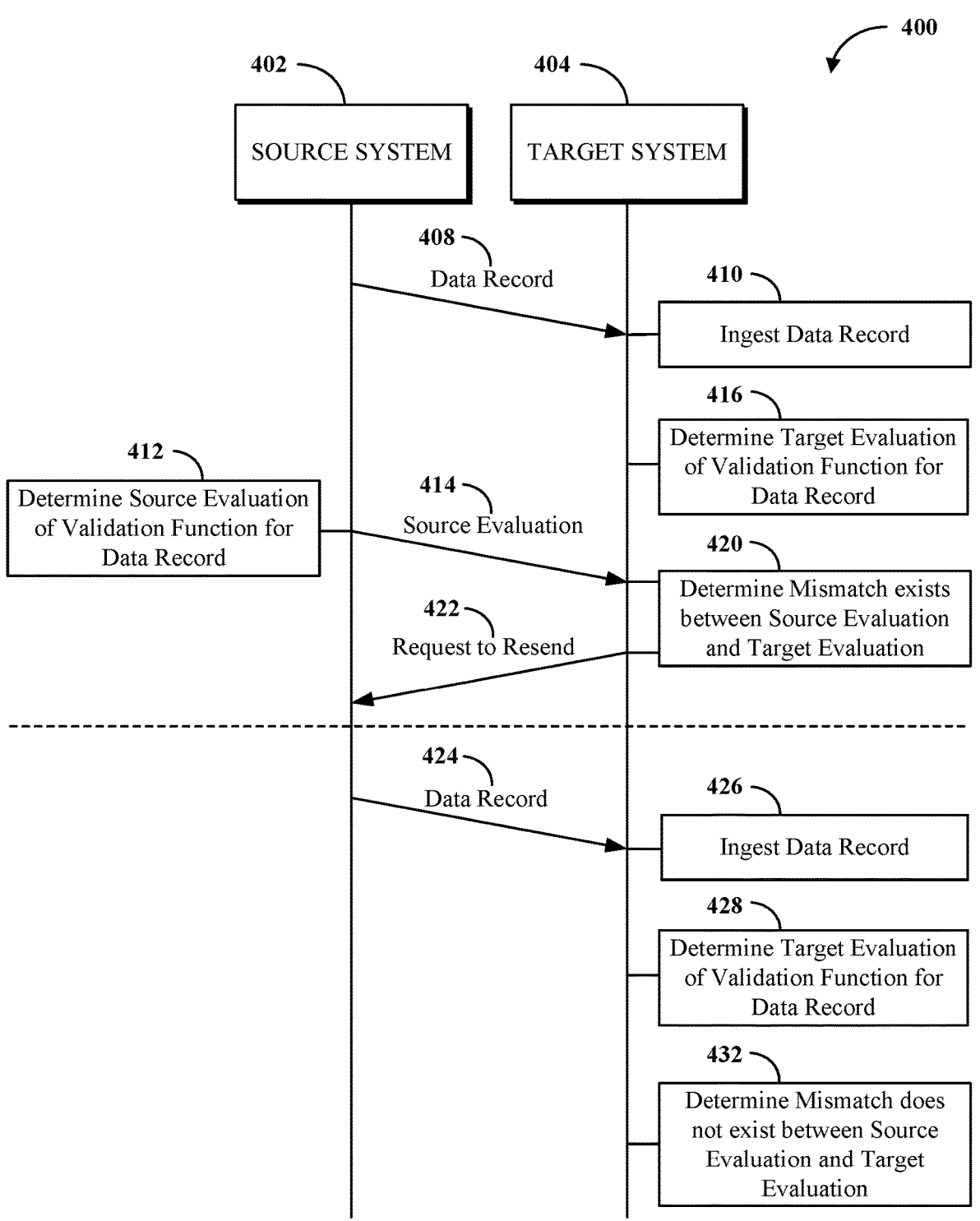
FIG. 4 is a time-space diagram of an example of synchronizing data records between loosely coupled systems at a target system.

FIG. 4 shows a time-space diagram of an example implementation 400 of synchronizing data records between loosely coupled systems at a target system 404. The source system 402, which may be an instance of the computing device 200 of FIG. 2, sends at least one data record 408 to the target system 404, which may also be an instance of the computing device 200 of FIG. 2. The data record 408 may be sent via a network, such as the network 140 of FIG. 1. The target system 404 ingests the data record 408 in an ingest step 410, where ingesting the data record 408 comprises receiving and parsing the data record 408 and saving the data record 408 to a memory, such as an instance of the memory 204 of FIG. 2.

The target system 404 evaluates a validation function for the data record 408 in a determining target evaluation step 416. In some implementations, the target system 404 evaluates the validation function for the data record 408 immediately or shortly after receiving the data record 408. In some implementations, the target system 404 delays evaluating the validation function for the data record 408 until, for example, the target system 404 receives a threshold quantity, or count, of data records 408 or until a scheduled time for evaluating validation functions arrives. The target evaluation is an output, or result, of the target system 404 evaluating the validation function with the data record 408 as an input to the validation function. In some implementations, the target system 404 may receive the validation function from the source system 402. In some implementations, the target system 404 may receive an indication of an association of the validation function with the data record, for example, from the source system 402. The association may be specific to the data record 408, or it may be specific to one or more types of data records, of which the data record 408 is at least one type. For example, the data record 408 may comprise monthly invoices for a customer, which could be broadly categorized as an "invoice" data-record type, and the validation function could be associated with all data records of the "invoice" data-record type. The target system 404 may receive the validation function and the indication of the association of the validation function with the data record 408 before, contemporaneously with, or after receiving the data record 408.

The source system 402 evaluates the validation function for the data record 408 in a determining source evaluation step 412. The determining source evaluation step 412 may occur before or after the source system 402 sends the data record 408 to the target system 404. The source evaluation 414 is an output, or result, of the source system 402 evaluating the validation function with the data record 408 as an input to the validation function. Both the source system 402 and the target system 404 evaluate the same validation function based on the same data records 408, such that the source evaluation 414 and the target evaluation are expected to be identical for a properly functioning distributed SaaS environment.

The source system 402 sends the source evaluation 414 to the target system 404. In some implementations, the source system 402 sends the source evaluation 414 immediately or shortly after sending the data record 408. In some implementations, the source system 402 delays sending the source evaluation 414 until, for example, the source system 402 evaluates a threshold quantity, or count, of validation functions or until a scheduled time for sending source evaluations arrives. In some implementations, the source system 402 expects to receive a response, or acknowledgment, from the target system 404 confirming that the target system 404 received the source evaluation. In some implementations, the source system 402 resends the source evaluation 414 if the source system 402 does not receive an expected response, or acknowledgment, from the target system 404 within a given duration. In some implementations, the source system 402 sends the source evaluation 414 to the target system 404 at predefined intervals, e.g., daily or weekly. In some implementations, the target system 404 may indicate a predefined interval to the source system 402.

The target system 404 compares the source evaluation 414 to the target evaluation in a determining mismatch step 420, and if a mismatch exists, the target system 404 executes a predefined action 422 for synchronizing the data record 408 at the source system 402. In some implementations, the target system 404 delays comparing the source evaluation 414 to the target evaluation until, for example, a threshold quantity, or count, of source evaluations 414 has been received or until a scheduled time for daily comparisons arrives. In the example of FIG. 4, the action 422 comprises the target system 404 sending a request to the source system 402 to resend the data record 408, or a subset thereof, to the target system 404. Another example of the predefined action 422 (not shown in FIG. 4) comprises the target system 404 sending an error message to a computing device that may trigger manual intervention, e.g., analysis by a human. In some implementations, the target system 404 delays executing the predefined action 422 until, for example, a threshold quantity, or count, of mismatches has been determined or until a scheduled time for daily synchronizations arrives. In some implementations, the target system 404 may consider the count of mismatches in determining whether to execute the predefined action 422, e.g., executing the predefined action 422 only if a threshold quantity of mismatches occurs within a given duration (where the duration may be infinite, and where the count may reset upon executing the predefined action 422). In some implementations, the target system 404 may consider a degree of mismatch, or criticality, in determining whether and/or when to execute the predefined action 422, e.g., executing the predefined action 422 only if difference between the source evaluation 414 and the target evaluation is greater than a given percentage of the source evaluation 414. In some implementations, the target system 404 may consider a priority, or priority level, of the validation function in determining whether and/or when to execute the predefined action 422, e.g., executing the predefined action 422 only if the evaluation function yielding a mismatch has a priority that exceeds a threshold priority.

In some implementations, the validation function comprises an aggregation operation. In some implementations, the validation function comprises at least one of a summation operation; an average operation; a count operation; a minimum operation; or a maximum operation. For example, using the example of monthly invoices from above, the data record may comprise all unpaid customer invoices. Each invoice may indicate, for example, an invoice number, a customer name, a customer address, and a balance due, where the invoice number may be categorized as an invoice-number data-record type, the customer name and customer address may be categorized as an invoice-string data-record type, and the balance due may be categorized as an invoice-balance data-record type.

An example of a validation function for the invoice-balance data-record type may comprise a summation of all balances due for all unpaid invoices. Both the source system 402 and the target system 404 would evaluate this validation function by summing the balance due across all unpaid invoices. The source system 402 would send to the target system 404 the source evaluation 414 that comprises the sum, i.e., a total balance due, as opposed to multiple balances due from multiple invoices. The target system 404 would compare the source evaluation 414 (i.e., the total balance due as determined by the source system 402) to the target evaluation (i.e., the total balance due as determined by the target system 404) to determine mismatches between the data record 408 stored at the source system 402 and the data record 408 stored at the target system 404.

An example of a validation function for the invoice-number data-record type may comprise a count of all invoice numbers for all unpaid invoices. Both the source system 402 and the target system 404 would evaluate this validation function by counting the quantity of invoice numbers across all unpaid invoices. The source system 402 would send to the target system 404 the source evaluation 414 that comprises the count, i.e., a single count of unpaid invoices, as opposed to multiple invoice numbers from multiple invoices. The target system 404 would compare the source evaluation 414 (i.e., the invoice count as determined by the source system 402) to the target evaluation (i.e., the invoice count as determined by the target system 404) to determine mismatches between the data record 408 stored at the source system 402 and the data record 408 stored at the target system 404.

In both of the preceding examples, the source evaluation 414 that is sent from the source system 402 to the target system 404 typically consists of less data, or at least not more data, than the original data record 408 sent from the source system 402 to the target system 404.

After the target system 404 sends the request to the source system 402 to resend the data record 408 as the predefined action 422: the source system 402 resends the data record 424; the target system 404 ingests the data record in another ingest step 426; the target system 404 evaluates the validation function for the data record 424 in another determining target evaluation step 428; and the target system 404 compares the source evaluation 414 to the newly determined target evaluation in another determining mismatch step 432.

Figure 5:
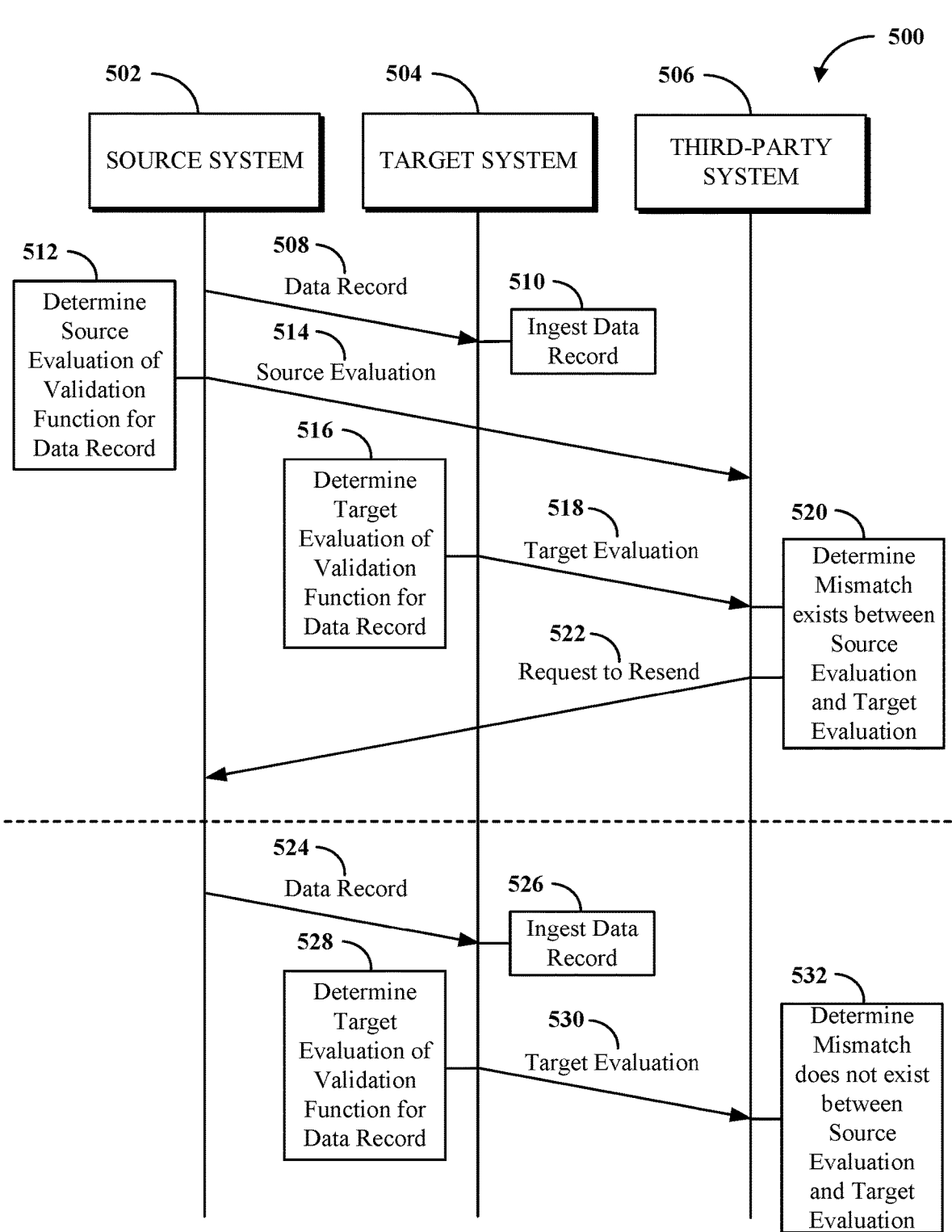
FIG. 5 is a time-space diagram of an example of synchronizing data records between loosely coupled systems at a third-party system.

FIG. 5 shows a time-space diagram of an example implementation 500 of synchronizing data records 508 between loosely coupled systems at a third-party system 506. The third-party system 506 may be a server, such as an instance of the computing device 200 of FIG. 2, executing software instructions of an application that perform operations as described below. The source system 502, which may be an instance of the computing device 200 of FIG. 2, sends at least one data record 508 to the target system 504, which may also be an instance of the computing device 200 of FIG. 2. The data record 508 may be sent via a network, such as the network 140 of FIG. 1. The target system 504 ingests the data record 508 in an ingest step 510, where ingesting the data record 508 comprises receiving and parsing the data record 508 and saving the data record 508 to a memory, such as an instance of the memory 204 of FIG. 2.

The target system 504 evaluates a validation function for the data record 508 in a determining target evaluation step 516. In some implementations, the determining target evaluation step 516 may occur immediately or shortly after receiving the data record 508. In some implementations, the target system 504 delays evaluating the validation function for the data record 508 until, for example, the target system 504 receives a threshold quantity, or count, of data records

508 or until a scheduled time for evaluating validation functions arrives. The target evaluation 518 is an output, or result, of the target system 504 evaluating the validation function with the data record 508 as an input to the validation function. In some implementations, the target system 504 may receive the validation function from the source system 502 or the third-party system 506. In some implementations, the target system 504 may receive an indication of an association of the validation function with the data record, for example, from the source system 502 or the third-party system 506. The association may be specific to the data record 508, or it may be specific to one or more types of data records, of which the data record 508 is at least one type. For example, the data record 508 may comprise monthly invoices for a customer, which could be broadly categorized as an "invoice" data-record type, and the validation function could be associated with all data records of the "invoice" data-record type. The target system 504 may receive the validation function and the indication of the association of the validation function with the data record 508 before, contemporaneously with, or after receiving the data record 508.

The target system 504 sends the target evaluation 518 to the third-party system 506. In some implementations, the target system 504 sends the target evaluation 518 immediately or shortly after evaluating the validation function. In some implementations, the target system 504 delays sending the target evaluation 518 until, for example, the target system 504 evaluates a threshold quantity, or count, of validation functions or until a scheduled time for sending target evaluations 518 arrives. In some implementations, the target system 504 expects to receive a response, or acknowledgment, from the third-party system 506 confirming that the third-party system 506 received the target evaluation 518. In some implementations, the target system 504 resends the target evaluation 518 if the target system 504 does not receive an expected response, or acknowledgment, from the third-party system 506 within a given duration. In some implementations, the target system 504 sends the target evaluation 518 to the third-party system 506 at predefined intervals, e.g., daily or weekly. In some implementations, the source system 502 or the third-party system 506 may indicate a predefined interval to the target system 504.

The source system 502 evaluates the validation function for the data record 508 in a determining source evaluation step 512. The determining source evaluation step 512 may occur before or after the source system 502 sends the data record 508 to the target system 504. In some implementations, the source system 502 delays evaluating the validation function for the data record 508 until, for example, the source system 502 sends a threshold quantity, or count, of data records 508 to the target system 504 or until a scheduled time for evaluating validation functions arrives. The source evaluation 514 is an output, or result, of the source system 502 evaluating the validation function with the data record 508 as an input to the validation function. In some implementations, the source system 502 may receive the validation function from the target system 504 or the third-party system 506. In some implementations, the source system 502 may receive an indication of an association of the validation function with the data record, for example, from the target system 504 or the third-party system 506. The association may be specific to the data record 508, or it may be specific to one or more types of data records, of which the data record 508 is at least one type. For example, the data record 508 may comprise monthly invoices for a customer, which could be broadly categorized as an "invoice" data-record type, and the validation function could be associated with all data records of the "invoice" data-record type. The source system 502 may receive the validation function and the indication of the association of the validation function with the data record 508 before, contemporaneously with, or after sending the data record 508. The source evaluation 514 is an output, or result, of the source system 502 evaluating the validation function with the data record 508 as an input to the validation function. Both the source system 502 and the target system 504 evaluate the same validation function based on the same data records 508, such that the source evaluation 514 and the target evaluation 518 are expected to be identical for a properly functioning distributed SaaS environment.

The source system 502 sends the source evaluation 514 to the third-party system 506. The source system 502 sends the source evaluation 514 to the third-party system before or after sending the data record 508 to the target system 504. In some implementations, the source system 502 delays sending the source evaluation 514 until, for example, the source system 502 evaluates a threshold quantity, or count, of validation functions or until a scheduled time for sending source evaluations arrives. In some implementations, the source system 502 expects to receive a response, or acknowledgment, from the third-party system 506 confirming that the third-party system 506 received the source evaluation 514. In some implementations, the source system 502 resends the source evaluation 514 if the source system 502 does not receive an expected response, or acknowledgment, from the third-party system 506 within a given duration. In some implementations, the source system 502 sends the source evaluation 514 to the third-party system 506 at predefined intervals, e.g., daily or weekly. In some implementations, the target system 504 or the third-party system 506 may indicate a predefined interval to the source system 502.

The third-party system 506 compares the source evaluation 514 to the target evaluation 518 in a determining mismatch step 520, and if a mismatch exists, the third-party system 506 executes a predefined action 522 for synchronizing the data record 508 at the source system 502 and the target system 504. In some implementations, the third-party system 506 delays comparing the source evaluation 514 to the target evaluation 518 until, for example, a threshold quantity, or count, of source evaluations 514 has been received and/or a threshold quantity, or count, of target evaluations 518 has been received, or until a scheduled time for daily comparisons arrives. In the example of FIG. 5, the action 522 comprises the third-party system 506 sending a request to the source system 502 to resend the data record 508, or a subset thereof, to the target system 504. Another example of the predefined action 522 (not shown in FIG. 5) comprises the third-party system 506 sending an error message to a computing device that may trigger manual intervention, e.g., analysis by a human. In some implementations, the third-party system 506 delays executing the predefined action 522 until, for example, a threshold quantity, or count, of mismatches has been determined or until a scheduled time for daily synchronizations arrives. In some implementations, the third-party system 506 may consider the count of mismatches in determining whether to execute the predefined action 522, e.g., executing the predefined action 522 only if a threshold quantity of mismatches occurs within a given duration (where the duration may be infinite, and where the count may reset upon executing the predefined action 522). In some implementations, the third-party system 506 may consider a degree of mismatch, or criticality, in determining whether and/or when to execute the predefined action 522, e.g., executing the predefined action 522 only if difference between the source evaluation 514 and the target evaluation 518 is greater than a given percentage of the source evaluation 514. In some implementations, the third-party system 506 may consider a priority, or priority level, of the validation function in determining whether and/or when to execute the predefined action 522, e.g., executing the predefined action 522 only if the evaluation function yielding a mismatch has a priority that exceeds a threshold priority.

In some implementations, the validation function comprises an aggregation operation. In some implementations, the validation function comprises at least one of a summation operation; an average operation; a count operation; a minimum operation; or a maximum operation. For example, using the example of monthly invoices from above, the data record may comprise all unpaid customer invoices. Each invoice may indicate, for example, an invoice number, a customer name, a customer address, and a balance due, where the invoice number may be categorized as an invoice-number data-record type, the customer name and customer address may be categorized as an invoice-string data-record type, and the balance due may be categorized as an invoice-balance data-record type.

An example of a validation function for the invoice-balance data-record type may comprise a summation of all balances due for all unpaid invoices. Both the source system 502 and the target system 504 would evaluate this validation function by summing the balance due across all unpaid invoices. The source system 502 would send to the third-party system 506 the source evaluation 514, and the target system 504 would send to the third-party system 506 the target evaluation 518, each of which comprises a respective sum, i.e., a total balance due, as opposed to multiple balances due from multiple invoices. The third-party system 506 would compare the source evaluation 514 (i.e., the total balance due as determined by the source system 502) to the target evaluation 518 (i.e., the total balance due as determined by the target system 504) to determine mismatches between the data record 508 stored at the source system 502 and the data record 508 stored at the target system 504.

An example of a validation function for the invoice-number data-record type may comprise a count of all invoice numbers for all unpaid invoices. Both the source system 502 and the target system 504 would evaluate this validation function by counting the quantity of invoice numbers across all unpaid invoices. The source system 502 would send to the third-party system 506 the source evaluation 514 that comprises the count, i.e., a single count of unpaid invoices, as opposed to multiple invoice numbers from multiple invoices. The target system 504 would send to the third-party system 506 the target evaluation 518 that comprises the count, i.e., a single count of unpaid invoices, as opposed to multiple invoice numbers from multiple invoices. The third-party system 506 would compare the source evaluation 514 (i.e., the invoice count as determined by the source system 502) to the target evaluation 518 (i.e., the invoice count as determined by the target system 504) to determine mismatches between the data record 508 stored at the source system 502 and the data record 508 stored at the target system 504.

In both of the preceding examples, each of the source evaluation 514 that is sent from the source system 502 to the third-party system 506 and the target evaluation 518 that is sent from the target system 504 to the third-party system 506 typically consists of less data, or at least not more data, than the original data record 508 sent from the source system 502 to the target system 504.

After the third-party system 506 sends the request to the source system 502 to resend the data record 508 as the predefined action 533: the source system 502 resends the data record 524; the target system 504 ingests the data record in another ingest step 526; the target system 504 evaluates the validation function for the data record 524 in another determining target evaluation step 528; the target system 504 sends the newly determined target evaluation 530 to the third-party system 506; and the third-party system 506 compares the source evaluation 514 to the newly determined target evaluation 530 in another determining mismatch step 532.

To further describe some implementations in greater detail, reference is next made to examples of techniques 600, 700, and 800 which may be performed by or using one or more components for synchronizing loosely coupled systems, for example, distributed computing systems (e.g., distributed SaaS environments). FIGS. 6, 7, and 8 are respective flowcharts of examples of techniques for implementing synchronization of loosely coupled systems.

The techniques 600, 700, and 800 can be executed using computing devices, such as the systems, hardware, and software described or referenced with respect to FIGS. 1-5. The techniques 600, 700, and 800 can be performed, for example, by executing a machine-readable program or other computer-executable instructions, such as routines, instructions, programs, or other code. The steps, or operations, of the techniques 600, 700, and 800, or another technique, method, process, or algorithm described in connection with the implementations disclosed herein can be implemented directly in hardware, firmware, software executed by hardware, circuitry, or a combination thereof.

For simplicity of explanation, the techniques 600, 700, and 800 are depicted and described herein as a series of steps or operations. However, the steps or operations of the techniques 600, 700, and 800 in accordance with this disclosure can occur in various orders and/or concurrently. Additionally, other steps or operations not presented and described herein may be used. Furthermore, not all illustrated steps or operations may be required to implement a technique in accordance with the disclosed subject matter. The techniques 600, 700, and 800 may be performed by one or more components of a distributed computing system, which may be implemented as a distributed SaaS environment, such as one or more servers, such as the servers 110, 120, through 130 of FIG. 1, executing one or more applications, such as applications 112 through 114, 122 through 124, and 132 through 134 of FIG. 1.

Referring first to FIG. 6, the step 602 comprises sending, by a source system to a target system, one or more data records. The source system may be the source system 302 of FIG. 3. The target system may be the target system 304 of FIG. 3. The one or more data records may be the data record 308 of FIG. 3. The data records may be sent via a network, such as the network 140 of FIG. 1.

The step 604 comprises determining, by the source system, a set of source evaluations for a set of validation functions based on the data records. The source system may determine the set of source evaluations before or after the source system sends the one or more data records to the target system.

The step 606 comprises receiving, by the source system from the target system, a set of target evaluations for the set of validation functions determined by the target system based on the data records. The set of target evaluations may be the target evaluation 318 of FIG. 3. In some implementations, the source system receives the set of target evaluations immediately or shortly after the source system sends the one or more data records. In some implementations, the source system receives the set of target evaluations at predefined intervals, e.g., daily or weekly. In some implementations, the source system may indicate a predefined interval to the target system.

The step 608 comprises determining, by the source system, at least one mismatch between a respective target evaluation of a respective validation function and a respective source evaluation of the respective validation function. The source system compares the respective source evaluation to the respective target evaluation. In some implementations, the source system delays comparing the respective source evaluation to the respective target evaluation until, for example, a threshold quantity, or count, of respective target evaluations has been received or until a scheduled time for daily comparisons arrives.

The step 610 comprises executing, by the source system, in response to the at least one mismatch, a predefined action for synchronizing the data records at the target system with the data records at the source system. In some implementations, the predefined action comprises the source system resending the one or more data records, or a subset thereof, to the target system. In some implementations, the predefined action comprises the source system sending an error message to a computing device that may trigger manual intervention, e.g., analysis by a human. In some implementations, the source system delays executing the predefined action until, for example, a threshold quantity, or count, of mismatches has been determined or until a scheduled time for daily synchronizations arrives. In some implementations, the source system may consider the count of mismatches in determining whether to execute the predefined action, e.g., executing the predefined action only if a threshold quantity of mismatches occurs within a given duration (where the duration may be infinite, and where the count may reset upon executing the predefined action). In some implementations, the source system may consider a degree of mismatch, or criticality, in determining whether and/or when to execute the predefined action, e.g., executing the predefined action only if difference between a respective source evaluation and a respective target evaluation is greater than a given percentage of the respective source evaluation. In some implementations, the source system may consider a priority, or priority level, of a respective validation function in determining whether and/or when to execute the predefined action, e.g., executing the predefined action only if the respective evaluation function yielding a mismatch has a priority that exceeds a threshold priority.

Referring now to FIG. 7, the step 702 comprises receiving, by a target system from a source system, one or more data records. The source system may be the source system 402 of FIG. 4. The target system may be the target system 404 of FIG. 4. The one or more data records may be the data record 408 of FIG. 4. The data records may be sent via a network, such as the network 140 of FIG. 1.

The step 704 comprises determining, by the target system, a set of target evaluations for a set of validation functions based on the data records.

The step 706 comprises receiving, by the target system from the source system, a set of source evaluations for the set of validation functions determined by the source system based on the data records. The set of source evaluations may be the source evaluation 414 of FIG. 4. In some implementations, the target system receives the set of source evaluations immediately or shortly after the source system sends the one or more data records. In some implementations, the target system receives the set of source evaluations at predefined intervals, e.g., daily or weekly. In some implementations, the source system may indicate a predefined interval to the target system.

The step 708 comprises determining, by the target system, at least one mismatch between a respective target evaluation of a respective validation function and a respective source evaluation of the respective validation function. The target system compares the respective source evaluation to the respective target evaluation. In some implementations, the target system delays comparing the respective source evaluation to the respective target evaluation until, for example, a threshold quantity, or count, of respective source evaluations has been received or until a scheduled time for daily comparisons arrives.

The step 710 comprises executing, by the target system, in response to the at least one mismatch, a predefined action for synchronizing the data records at the target system with the data records at the source system. In some implementations, the predefined action comprises the target system sending a request to the source system to resend the data records, or a subset thereof, to the target system. In some implementations, the predefined action comprises the target system sending an error message to a computing device that may trigger manual intervention, e.g., analysis by a human. In some implementations, the target system delays executing the predefined action until, for example, a threshold quantity, or count, of mismatches has been determined or until a scheduled time for daily synchronizations arrives. In some implementations, the target system may consider the count of mismatches in determining whether to execute the predefined action, e.g., executing the predefined action only if a threshold quantity of mismatches occurs within a given duration (where the duration may be infinite, and where the count may reset upon executing the predefined action). In some implementations, the target system may consider a degree of mismatch, or criticality, in determining whether and/or when to execute the predefined action, e.g., executing the predefined action only if difference between a respective source evaluation and a respective target evaluation is greater than a given percentage of the respective source evaluation. In some implementations, the target system may consider a priority, or priority level, of a respective validation function in determining whether and/or when to execute the predefined action, e.g., executing the predefined action only if the respective evaluation function yielding a mismatch has a priority that exceeds a threshold priority.

Referring now to FIG. 8, the step 802 comprises receiving, by a third-party system from a source system, a set of source evaluations for a set of validation functions based on one or more data records stored by the source system. The source system may be the source system 502 of FIG. 5. The target system may be the target system 504 of FIG. 5. The third-party system may be the third-party system 506 of FIG. 5. The one or more data records may be the data record 508 of FIG. 5. The data records may be sent via a network, such as the network 140 of FIG. 1. The set of source evaluations may be the source evaluation 514 of FIG. 5. In some implementations, the third-party system receives the set of source evaluations at predefined intervals, e.g., daily or weekly. In some implementations, the third-party system may indicate a predefined interval to the target system.

The step 804 comprises receiving, by the third-party system from a target system, a set of target evaluations for the set of validation functions based on the data records received from the source system and stored by the target system. The set of target evaluations may be the target evaluation 518 of FIG. 5. In some implementations, the third-party system receives the set of target evaluations at predefined intervals, e.g., daily or weekly. In some implementations, the third-party system may indicate a predefined interval to the target system.

The step 806 comprises determining, by the third-party system, at least one mismatch between a respective target evaluation of a respective validation function and a respective source evaluation of the respective validation function. The third-party system compares the respective source evaluation to the respective target evaluation. In some implementations, the third-party system delays comparing the respective source evaluation to the respective target evaluation until, for example, a threshold quantity, or count, of source evaluations has been received and/or a threshold quantity, or count, of target evaluations has been received, or until a scheduled time for daily comparisons arrives.

The step 808 comprises executing, by the third-party system, in response to the at least one mismatch, a predefined action for synchronizing the data records at the target system with the data records at the source system. In some implementations, the predefined action comprises the third-party system sending a request to the source system to resend the data records, or a subset thereof, to the target system. In some implementations, the predefined action comprises the third-party system sending an error message to a computing device that may trigger manual intervention, e.g., analysis by a human. In some implementations, the third-party system delays executing the predefined action until, for example, a threshold quantity, or count, of mismatches has been determined or until a scheduled time for daily synchronizations arrives. In some implementations, the third-party system may consider the count of mismatches in determining whether to execute the predefined action, e.g., executing the predefined action only if a threshold quantity of mismatches occurs within a given duration (where the duration may be infinite, and where the count may reset upon executing the predefined action). In some implementations, the third-party system may consider a degree of mismatch, or criticality, in determining whether and/or when to execute the predefined action, e.g., executing the predefined action only if difference between a respective source evaluation and a respective target evaluation is greater than a given percentage of the respective source evaluation. In some implementations, the third-party system may consider a priority, or priority level, of a respective validation function in determining whether and/or when to execute the predefined action, e.g., executing the predefined action only if the respective evaluation function yielding a mismatch has a priority that exceeds a threshold priority.

Some implementations of synchronizing loosely coupled systems at a source system disclosed herein include a method, comprising: sending, by a source system to a target system, one or more data records; determining, by the source system, a set of source evaluations for a set of validation functions based on the data records; receiving, by the source system from the target system, a set of target evaluations for the set of validation functions determined by the target system based on the data records; determining, by the source system, at least one mismatch between a respective target evaluation of a respective validation function and a respective source evaluation of the respective validation function; and executing, by the source system, in response to the at least one mismatch, a predefined action for synchronizing the data records at the target system with the data records at the source system.

In some implementations, at least one of the validation functions comprises: an aggregation operation.

In some implementations, at least one of the validation functions comprises at least one of: a summation operation; an average operation; a count operation; a minimum operation; or a maximum operation.

In some implementations, the executing of the predefined action comprises at least one of: resending, by the source system, the data records to the target system; resending, by the source system, a subset of the data records to the target system; or sending, by the source system, an error message.

In some implementations, the method further comprises: delaying the executing of the predefined action by a predefined duration.

In some implementations, the method further comprises: determining, by the source system, a criticality of at least one of the mismatches; wherein the executing of the predefined action is in further response to the criticality exceeding a predefined threshold.

In some implementations, the method further comprises: determining, by the source system, a count of the at least one mismatch; wherein the executing of the predefined action is further responsive to the count exceeding a predefined threshold.

In some implementations, the method further comprises: determining, by the source system, the set of source evaluations at a predefined interval.

In some implementations, the method further comprises: receiving, by the source system, the set of target evaluations at a predefined interval.

Some implementations of synchronizing loosely coupled systems at a source system disclosed herein include a non-transitory computer-readable medium storing instructions operable to cause one or more processors to perform operations comprising: sending, by a source system to a target system, one or more data records; determining, by the source system, a set of source evaluations for a set of validation functions based on the data records; receiving, by the source system from the target system, a set of target evaluations for the set of validation functions determined by the target system based on the data records; determining, by the source system, at least one mismatch between a respective target evaluation of a respective validation function and a respective source evaluation of the respective validation function; and executing, by the source system, in response to the at least one mismatch, a predefined action for synchronizing the data records at the target system with the data records at the source system.

In some implementations, the operations further comprise: executing, by the source system, a software-as-a-service application that processes at least one of the data records.

In some implementations, the operations further comprise: determining, by the source system, the set of source evaluations at a predefined interval; and receiving, by the source system, the set of target evaluations at the predefined interval.

In some implementations, the operations further comprise: sending, by the source system to the target system, the set of validation functions.

In some implementations, at least one of the validation functions comprises at least one of: a summation operation; or a count operation.

In some implementations, the operations further comprise: determining, by the source system, whether the respective validation function has a priority that exceeds a predefined threshold; wherein the executing of the predefined action is in further response to the priority exceeding the predefined threshold.

Some implementations of synchronizing loosely coupled systems at a source system disclosed herein include a system, comprising: one or more memories; and one or more processors configured to execute instructions stored in the one or more memories to: send, by a source system to a target system, one or more data records; determine, by the source system, a set of source evaluations for a set of validation functions based on the data records; receive, by the source system from the target system, a set of target evaluations for the set of validation functions determined by the target system based on the data records; determine, by the source system, at least one mismatch between a respective target evaluation of a respective validation function and a respective source evaluation of the respective validation function; and execute, by the source system, in response to the at least one mismatch, a predefined action for synchronizing the data records at the target system with the data records at the source system.

In some implementations, the one or more processors are configured to execute the instructions to: send, by the source system to the target system, the set of validation functions; indicate, by the source system to the target system, a predefined interval; and receive, by the source system from the target system, the set of target evaluations at the predefined interval.

In some implementations, the one or more processors are configured to execute the instructions to: determine, by the source system, the at least one mismatch at a predefined interval.

In some implementations, the at least one mismatch comprises at least two mismatches.

In some implementations, the one or more processors are configured to execute the instructions to: determine, by the source system, a criticality of the at least one mismatch; and determine, by the source system, whether the respective validation function has a priority that exceeds a predefined priority threshold; wherein executing the instructions to execute the predefined action is in further response to either the criticality exceeding a predefined criticality threshold or the priority exceeding the predefined priority threshold.

Some implementations of synchronizing loosely coupled systems at a target system disclosed herein include a method, comprising: receiving, by a target system from a source system, one or more data records; determining, by the target system, a set of target evaluations for a set of validation functions based on the data records; receiving, by the target system from the source system, a set of source evaluations for the set of validation functions determined by the source system based on the data records; determining, by the target system, at least one mismatch between a respective target evaluation of a respective validation function and a respective source evaluation of the respective validation function; and executing, by the target system, in response to the at least one mismatch, a predefined action for synchronizing the data records at the target system with the data records at the source system.

In some implementations, at least one of the validation functions comprises: an aggregation operation.

In some implementations, at least one of the validation functions comprises at least one of: a summation operation;

an average operation; a count operation; a minimum operation; or a maximum operation.

In some implementations, the executing of the predefined action comprises at least one of: instructing the source system, by the target system, to resend the data records to the target system; instructing the source system, by the target system, to resend a subset of the data records to the target system; or sending, by the target system, an error message.

In some implementations, the method further comprises: delaying the executing of the predefined action by a predefined duration.

In some implementations, the method further comprises: determining, by the target system, a criticality of at least one of the mismatches; wherein the executing of the predefined action is in further response to the criticality exceeding a predefined threshold.

In some implementations, the method further comprises: determining, by the target system, a count of the at least one mismatch; wherein the executing of the predefined action is further responsive to the count exceeding a predefined threshold.

In some implementations, the method further comprises: determining, by the target system, the set of target evaluations at a predefined interval.

In some implementations, the method further comprises: receiving, by the target system, the set of source evaluations at a predefined interval.

Some implementations of synchronizing loosely coupled systems at a target system disclosed herein include a non-transitory computer-readable medium storing instructions operable to cause one or more processors to perform operations comprising: receiving, by a target system from a source system, one or more data records; determining, by the target system, a set of target evaluations for a set of validation functions based on the data records; receiving, by the target system from the source system, a set of source evaluations for the set of validation functions determined by the source system based on the data records; determining, by the target system, at least one mismatch between a respective target evaluation of a respective validation function and a respective source evaluation of the respective validation function; and executing, by the target system, in response to the at least one mismatch, a predefined action for synchronizing the data records at the target system with the data records at the source system.

In some implementations, the operations further comprise: executing, by the target system, a software-as-a-service application that processes at least one of the data records.

In some implementations, the operations further comprise: determining, by the target system, the set of target evaluations at a predefined interval; and receiving, by the target system, the set of source evaluations at the predefined interval.

In some implementations, the operations further comprise: receiving, by the target system from the source system, the set of validation functions.

In some implementations, at least one of the validation functions comprises at least one of: a summation operation; or a count operation.

In some implementations, the operations further comprise: determining, by the target system, whether the respective validation function has a priority that exceeds a predefined threshold; wherein the executing of the predefined action is in further response to the priority exceeding the predefined threshold.

Some implementations of synchronizing loosely coupled systems at a target system disclosed herein include a system, comprising: one or more memories; and one or more processors configured to execute instructions stored in the one or more memories to: receive, by a target system from a source system, one or more data records; determine, by the target system, a set of target evaluations for a set of validation functions based on the data records; receive, by the target system from the source system, a set of source evaluations for the set of validation functions determined by the source system based on the data records; determine, by the target system, at least one mismatch between a respective target evaluation of a respective validation function and a respective source evaluation of the respective validation function; and execute, by the target system, in response to the at least one mismatch, a predefined action for synchronizing the data records at the target system with the data records at the source system.

In some implementations, the one or more processors are configured to execute the instructions to: receive, by the target system from the source system, the set of validation functions; receive, by the target system from the source system, an indication of a predefined interval; determine, by the target system, the set of target evaluations at the predefined interval; and receive, by the target system from the source system, the set of source evaluations at the predefined interval.

In some implementations, the one or more processors are configured to execute the instructions to: determine, by the target system, the at least one mismatch at a predefined interval.

In some implementations, the at least one mismatch comprises at least two mismatches.

In some implementations, the one or more processors are configured to execute the instructions to: determine, by the target system, a criticality of the at least one mismatch; and determine, by the target system, whether the respective validation function has a priority that exceeds a predefined priority threshold; wherein executing the instructions to execute the predefined action is in further response to either the criticality exceeding a predefined criticality threshold or the priority exceeding the predefined priority threshold.

Some implementations of synchronizing loosely coupled systems at a third-party system disclosed herein include a method, comprising: receiving, by a third-party system from a source system, a set of source evaluations for a set of validation functions based on one or more data records stored by the source system; receiving, by the third-party system from a target system, a set of target evaluations for the set of validation functions based on the data records received from the source system and stored by the target system; determining, by the third-party system, at least one mismatch between a respective target evaluation of a respective validation function and a respective source evaluation of the respective validation function; and executing, by the third-party system, in response to the at least one mismatch, a predefined action for synchronizing the data records at the target system with the data records at the source system.

In some implementations, at least one of the validation functions comprises: an aggregation operation.

In some implementations, at least one of the validation functions comprises at least one of: a summation operation; an average operation; a count operation; a minimum operation; or a maximum operation.

In some implementations, the executing of the predefined action comprises at least one of: instructing the source system, by the third-party system, to resend the data records to the target system; instructing the source system, by the third-party system, to resend a subset of the data records to the target system; or sending, by the third-party system, an error message.

In some implementations, the method further comprises: delaying the executing of the predefined action by a predefined duration.

In some implementations, the method further comprises: determining, by the third-party system, a criticality of at least one of the mismatches; wherein the executing of the predefined action is in further response to the criticality exceeding a predefined threshold.

In some implementations, the method further comprises: determining, by the third-party system, a count of the at least one mismatch; wherein the executing of the predefined action is further responsive to the count exceeding a predefined threshold.

In some implementations, the method further comprises: receiving, by the third-party system, the set of source evaluations at a predefined interval.

In some implementations, the method further comprises: receiving, by the third-party system, the set of target evaluations at a predefined interval.

Some implementations of synchronizing loosely coupled systems at a third-party system disclosed herein include a non-transitory computer-readable medium storing instructions operable to cause one or more processors to perform operations comprising: receiving, by a third-party system from a source system, a set of source evaluations for a set of validation functions based on one or more data records stored by the source system; receiving, by the third-party system from a target system, a set of target evaluations for the set of validation functions based on the data records received from the source system and stored by the target system; determining, by the third-party system, at least one mismatch between a respective target evaluation of a respective validation function and a respective source evaluation of the respective validation function; and executing, by the third-party system, in response to the at least one mismatch, a predefined action for synchronizing the data records at the target system with the data records at the source system.

In some implementations, the source system is configured to execute a first software-as-a-service application that processes at least one of the data records; and the target system is configured to execute a second software-as-a-service application that processes at least one of the data records.

In some implementations, the operations further comprise: receiving, by the third-party system, the set of source evaluations at a predefined interval; and receiving, by the third-party system, the set of target evaluations at the predefined interval.

In some implementations, the operations further comprise: sending, by the third-party system to the source system, the set of validation functions; and sending, by the third-party system to the target system, the set of validation functions.

In some implementations, at least one of the validation functions comprises at least one of: a summation operation; or a count operation.

In some implementations, the operations further comprise: determining, by the third-party system, whether the respective validation function has a priority that exceeds a predefined threshold; wherein the executing of the predefined action is in further response to the priority exceeding the predefined threshold.

Some implementations of synchronizing loosely coupled systems at a third-party system disclosed herein include a system, comprising: one or more memories; and one or more processors configured to execute instructions stored in the one or more memories to: receive, by a third-party system from a source system, a set of source evaluations for a set of validation functions based on one or more data records stored by the source system; receive, by the third-party system from a target system, a set of target evaluations for the set of validation functions based on the data records received from the source system and stored by the target system; determine, by the third-party system, at least one mismatch between a respective target evaluation of a respective validation function and a respective source evaluation of the respective validation function; and execute, by the third-party system, in response to the at least one mismatch, a predefined action for synchronizing the data records at the target system with the data records at the source system.

In some implementations, the one or more processors are configured to execute the instructions to: send, by the third-party system to the source system, the set of validation functions and an indication of a predefined interval; send, by the third-party system to the target system, the set of validation functions and the indication of the predefined interval; receive, by the third-party system from the source system, the set of source evaluations at the predefined interval; and receive, by the third-party system from the target system, the set of target evaluations at the predefined interval.

In some implementations, the one or more processors are configured to execute the instructions to: determine, by the third-party system, the at least one mismatch at a predefined interval.

In some implementations, the at least one mismatch comprises at least two mismatches.

In some implementations, the one or more processors are configured to execute the instructions to: determine, by the third-party system, a criticality of the at least one mismatch; and determine, by the third-party system, whether the respective validation function has a priority that exceeds a predefined priority threshold; wherein executing the instructions to execute the predefined action is in further response to either the criticality exceeding a predefined criticality threshold or the priority exceeding the predefined priority threshold.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

sending, by a source system to a target system, one or more data records;

determining, by the source system, a set of source evaluations for a set of validation functions based on the one or more data records;

receiving, by the source system from the target system, a set of target evaluations for the set of validation functions determined by the target system based on the one or more data records;

determining, by the source system, at least one mismatch between a respective target evaluation of a respective validation function and a respective source evaluation of the respective validation function by comparing the set of source evaluations to the set of target evaluations; and executing, by the source system, in response to the at least one mismatch, a predefined action for synchronizing the one or more data records at the target system with the one or more data records at the source system.

2. The method of claim 1, wherein at least one of the validation functions comprises:

an aggregation operation.

3. The method of claim 1, wherein at least one of the validation functions comprises at least one of:

a summation operation;

an average operation;

a count operation;

a minimum operation; or a maximum operation.

4. The method of claim 1, wherein the executing of the predefined action comprises at least one of:

resending, by the source system, the one or more data records to the target system;

resending, by the source system, a subset of the one or more data records to the target system; or sending, by the source system, an error message.

5. The method of claim 1, further comprising:

delaying the executing of the predefined action by a predefined duration.

6. The method of claim 1, further comprising:

determining, by the source system, a criticality of one or more of the at least one mismatch; wherein the executing of the predefined action is in further response to the criticality exceeding a predefined threshold.

7. The method of claim 1, further comprising:

determining, by the source system, a count of the at least one mismatch; wherein the executing of the predefined action is further responsive to the count exceeding a predefined threshold.

8. The method of claim 1, further comprising:

determining, by the source system, the set of source evaluations at a predefined interval.

9. The method of claim 1, further comprising:

receiving, by the source system, the set of target evaluations at a predefined interval.

10. A non-transitory computer-readable medium storing instructions operable to cause one or more processors to perform operations comprising:

sending, by a source system to a target system, one or more data records;

determining, by the source system, a set of source evaluations for a set of validation functions based on the one or more data records;

receiving, by the source system from the target system, a set of target evaluations for the set of validation functions determined by the target system based on the one or more data records;

determining, by the source system, at least one mismatch between a respective target evaluation of a respective validation function and a respective source evaluation of the respective validation function by comparing the set of source evaluations to the set of target evaluations; and executing, by the source system, in response to the at least one mismatch, a predefined action for synchronizing the one or more data records at the target system with the one or more data records at the source system.

11. The non-transitory computer-readable medium of claim 10, the operations further comprising:

executing, by the source system, a software-as-a-service application that processes at least one of the one or more data records.

12. The non-transitory computer-readable medium of claim 10, the operations further comprising:

determining, by the source system, the set of source evaluations at a predefined interval; and receiving, by the source system, the set of target evaluations at the predefined interval.

13. The medium of claim 10, the operations further comprising:

sending, by the source system to the target system, the set of validation functions.

14. The non-transitory computer-readable medium of claim 10, wherein at least one of the set of validation functions comprises at least one of:

a summation operation; or a count operation.

15. The non-transitory computer-readable medium of claim 10, the operations further comprising:

determining, by the source system, whether the respective validation function has a priority that exceeds a predefined threshold; wherein the executing of the predefined action is in further response to the priority exceeding the predefined threshold.

16. A system, comprising:

one or more memories; and one or more processors configured to execute instructions stored in the one or more memories to:

send, by a source system to a target system, one or more data records;

determine, by the source system, a set of source evaluations for a set of validation functions based on the one or more data records;

receive, by the source system from the target system, a set of target evaluations for the set of validation functions determined by the target system based on the one or more data records;

determine, by the source system, at least one mismatch between a respective target evaluation of a respective validation function and a respective source evaluation of the respective validation function by comparing the set of source evaluations to the set of target evaluations; and execute, by the source system, in response to the at least one mismatch, a predefined action for synchronizing the one or more data records at the target system with the one or more data records at the source system.

17. The system of claim 16, wherein the one or more processors are configured to execute the instructions to:

send, by the source system to the target system, the set of validation functions;

indicate, by the source system to the target system, a predefined interval; and receive, by the source system from the target system, the set of target evaluations at the predefined interval.

18. The system of claim 16, wherein the one or more processors are configured to execute the instructions to:

determine, by the source system, the at least one mismatch at a predefined interval.

19. The system of claim 16, wherein:

the at least one mismatch comprises at least two mismatches.

20. The system of claim 16, wherein the one or more processors are configured to execute the instructions to:

determine, by the source system, a criticality of the at least one mismatch; and determine, by the source system, whether the respective validation function has a priority that exceeds a predefined priority threshold; wherein executing the instructions to execute the predefined action is in further response to either the criticality exceeding a predefined criticality threshold or the priority exceeding the predefined priority threshold.

* * * * *